Nov. 6, 1923.
O. J. DORWIN
MEASURING APPARATUS
Filed Aug. 16, 1920
1,473,473
2 Sheets-Sheet 2
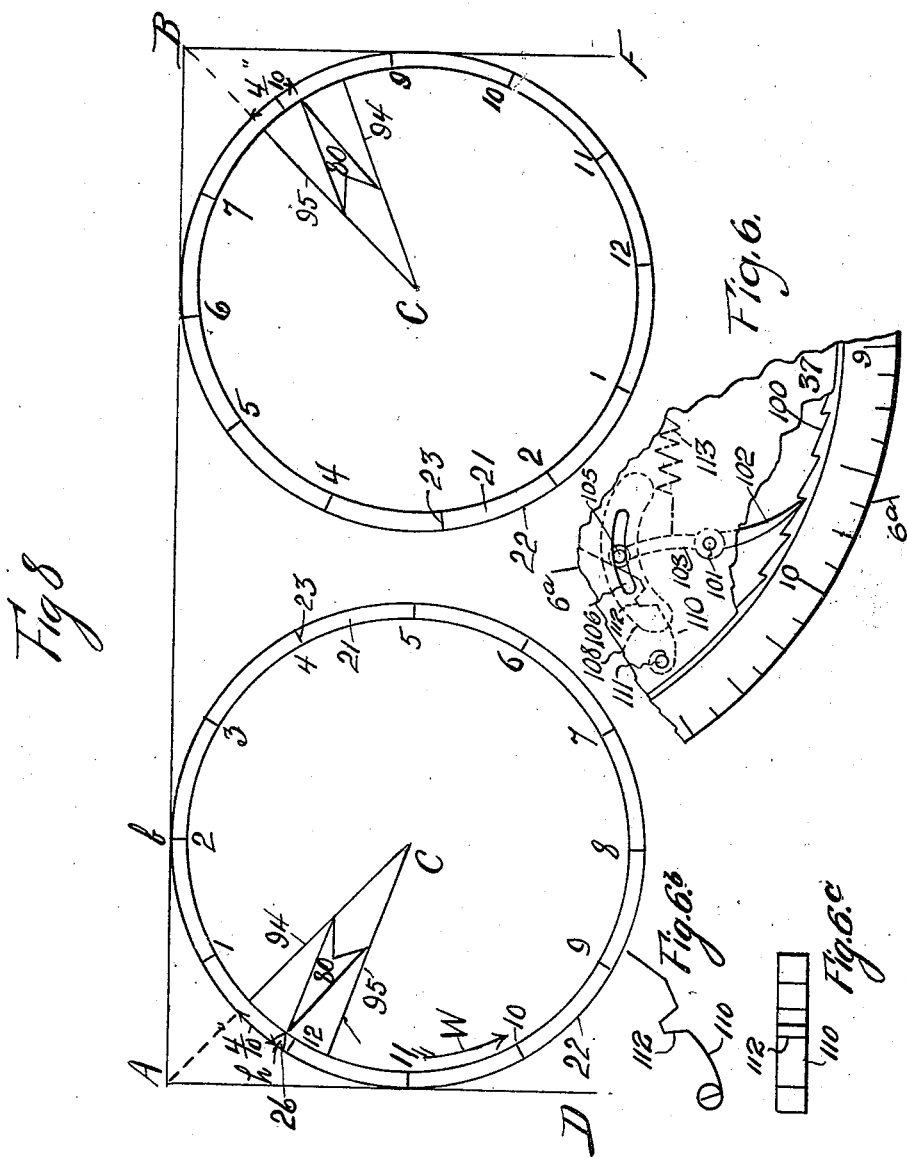

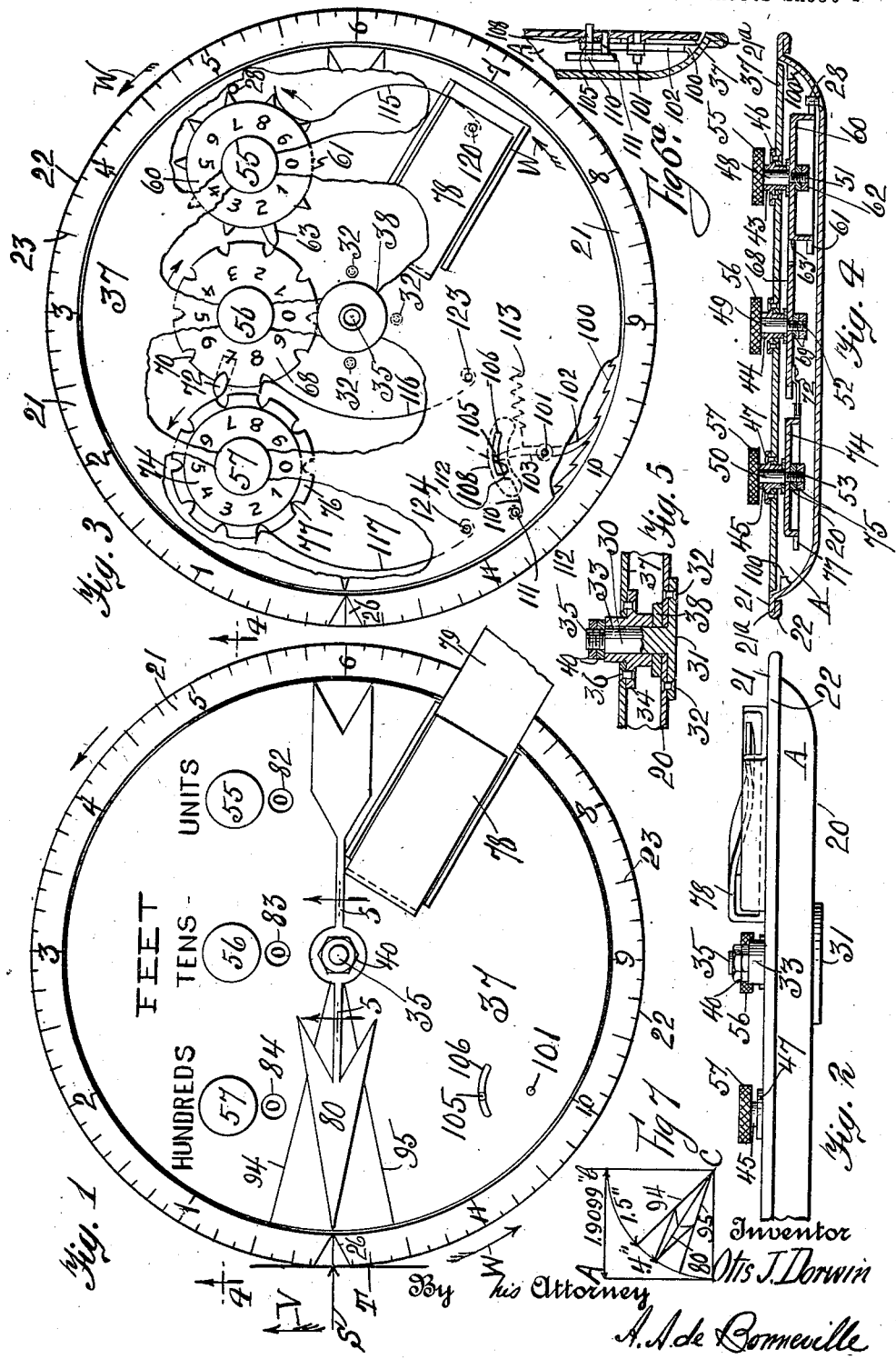

Patented Nov. 6, 1923.

1,473,473

UNITED STATES PATENT OFFICE.

OTIS J. DORWIN, OF NEW YORK, N. Y.

MEASURING APPARATUS.

Application filed August 16, 1920. Serial No. 403,876.

*To all whom it may concern:*

Be it known that I, OTIS J. DORWIN, citizen of the United States, and resident of the borough of Manhattan, city of New York, in the county of New York and State of New York, have invented certain new and useful Improvements in a Measuring Apparatus, of which the following is a specification.

This invention relates to a measuring apparatus which I will term herein a rotometer. It is an improvement of my measuring apparatus described in my United States Patent No. 1,203,103, dated October 31, 1916. The present invention has for some of its objects the production of an apparatus that is very simple in construction and which has counters that can be turned in opposite direction. It also includes means for measuring distances from a corner to a point on a line and from one corner to another.

The accompanying drawings represent an exemplification of the rotometer, of which Fig. 1 is an outside front elevation; Fig. 2 shows an end view of the rotometer with a portion broken away; Fig. 3 represents a front view of the rotometer with some of its parts omitted and portions of its dial plate broken away; Fig. 4 is a section on the line 4, 4 of Fig. 1; Fig. 5 shows an enlarged section on the line 5, 5 of Fig. 1; Fig. 6 represents a fragmentary portion of Fig. 3 on an enlarged scale; Fig. 6$^a$ indicates a section of Fig. 6 on the line 6$^a$, 6$^a$, Fig. 6$^b$ shows an elevation of a detail; Fig. 6$^c$ represents a top plan view of Fig. 6$^b$; Fig. 7 shows a diagram exemplifying the principle of one of the features of the apparatus and Fig. 8 shows a diagrammatic view of the apparatus and the method of measuring a wall from corner to corner.

The casing A of the rotometer is shown with the rear wall 20 having the rim 21, the latter being turned over to form a thin flange 21$^a$ with the curved rolling edge 22. The rim 21 has marked thereon a scale 23 with twelve main divisions. Each of the main divisions, although on a larger scale in the drawings, represents one inch. Each of the main divisions in this instance is divided into eight subdivisions representing each one eighth of an inch. An arrow 26 is also indicated on the rim 21. A pin 28 extends up from the inside face of the rear wall 20.

A spindle or pivot 30 has formed therewith the disc flange 31, which latter is fastened to the rear wall 20 of the casing A by means of the rivets 32. A journal bearing 33 with the flange 34 is journaled on the pivot 30 having the threaded end 35. Rivets 36 fasten the flange 34 to the dial plate 37 and a washer 38 is interposed between the lower edge of the bearing 33 and the inner face of the wall 20. Lock nuts 40 are in threaded engagement with the threaded end 35 of the pivot 30. In the dial plate 37 are formed three openings for the insertion of the similar journal bearings 43, 44 and 45 that have each extending therefrom the flange 46. These flanges bear upon the dial plate 37 and are fastened thereto by means of the rivets 47. Similar pivots or journal pins 48, 49 and 50 each respectively with the threaded portions 51, 52, 53 at one end and the similar knurled heads 55, 56 and 57 at the other are respectively journaled in the bearings 43, 44 and 45. A cup shaped counter 60 with numerals 0 to 9 on its face and the similar teeth 61 at its lower circumferential portion is fastened to the threaded portion 51 of the pivot 48 by means of the lock nuts 62. A supplemental tooth 63 longer than the teeth 61 extends from the upper portion of the counter 60.

A disc counter 68 with the numerals 0 to 9 on its upper face is supported on the threaded portion 52 of the journal pin 49 and is held in place by the lock nuts 69. Indentations 70 are formed in the circumferential edge of the disc counter which can mesh with the tooth 63. A supplemental tooth 72 extends from and below the lower face of the disc counter 68 and its path when the latter is turning clears the teeth 61 and the tooth 63. A cup-shaped counter 74 with the numerals 0 to 9 on its upper face is supported on the threaded portion 53 of the journal pin 50 and is locked in place by the lock nuts 75. An annular flange 76 with indentations 77 extends from the lower portion of the counter 74. The indentations 77 can mesh with the tooth 72. A clamping bracket 78 is supported on the dial plate 37 and has clamped therein the operating handle 79. A pointer 80 is indicated on the dial plate 37. Three openings 82, 83 and 84 are formed in the dial plate 37 and are respectively located in the paths of the numerals of the counters 60, 68 and 74.

On the dial 37 is also indicated the word feet, and the words units, tens and hundreds, which latter are respectively adjacent to the openings 82, 83 and 84.

Radial corner indicating lines 94 and 95 are indicated on the dial 37.

In the casing A there are formed ratchet teeth 100. On the dial plate 37 is pivoted by means of a pivot 101, a pawl with the arms 102 and 103. An adjusting pin 105 extends from the arm 103 and passes through an opening 106 in the dial plate 37. A cover plate 108 is fastened to the pin 105 and bears against the lower face of the dial plate 37 to at all times maintain the opening 106 covered. A spring latch 110 has one end fastened to a pin 111 extending from the lower face of the plate 37. The spring latch 110 has a depression 112 which normally does not lock with the adjusting pin 105. A spring 113 has one end fastened to the lower face of the dial plate 37 and its other end is fastened to the arm 103. The spring 113 maintains the arm 102 in contact with the ratchet teeth 100. When the pawl is located as indicated in Fig. 3 the rim 21 may turn in the direction of the arrows W thereby avoiding running the casing A in the wrong direction. If for any special reason the casing A is to be run in the opposite direction, the arm 102 is raised and disengaged from the ratchet teeth 100 and the locking pin 105 locked with the depression 112 of the spring latch 110. To maintain counters 60, 68 and 74 in proper operative position springs 115, 116 and 117 are provided to coact with them. The spring 115 has one end fastened to a pin 120 extending from the bottom face of the dial plate 37 and its other end engages the teeth 61. The spring 116 has one end fastened to a pin 123 extending from the bottom face of the dial plate 37 and its other end engages the indentations 70 of the counter 68. The spring 117 has one end fastened to a pin 124 extending from the bottom face of the dial plate 37 and its other end engages the indentations 77 of the counter 74.

To use the rotometer, the zero of each of the counters 60, 68 and 74 is respectively brought into registry with the openings 82, 83 and 84 by turning them by means of the knurled heads 55, 56 and 57. The teeth and indentations of the counters permit them to be turned in opposite directions. Next the point of the arrow 26 on the rim 21, is brought opposite the point of the pointer 80 on the dial plate 37.

The rotometer is then brought into contact with the surface to be measured, if there is no corner, with the zero division of the scale on the rim 21 over the starting point as indicated by the arrow S. The rolling edge 22 of the casing A is then rolled on the surface T in the direction of arrow V which turns the casing in the direction of the arrow W. The dial plate 37 is prevented rotating while the casing A is rolling on the surface T by reason of the handle 79 being clamped by the bracket 78. With the turning of the casing A, the arrow 26 is caused to travel in the direction of the arrow W. The pin 28 engages one of the teeth 61 of the counter 60, and moves it in a counter clockwise direction an amount equal to the distance between a pair of teeth for each revolution of the casing A.

For each revolution of the rotometer a new number will be shown through the openings 82. Each number indicates one foot of linear travel for the casing A on the surface T. Before the end of the revolution of the counter 60, the tooth 63 thereof engages one of the indentations 70 of the disc counter 68 and when the counter 60 has completed its revolution the disc counter 68 has been turned in a clockwise direction the distance between two of its indentations and the numeral 1 is indicated through the opening 83, showing that the casing A has traveled 10 feet. Before the counter 68 has completed a revolution, its tooth 72 has engaged one of the indentations 77 of the counter 74 and when the counter 68 has completed its revolution the numeral 1 will be indicated through the opening 84 indicating that the casing has traveled one hundred feet. The inches and fractions of inches will be indicated by reading the scale on the rim 21 with reference to the pointer 80. Upon the further traveling of the casing A the operations described are repeated.

Referring to Fig. 7 the length of the circumference of the rolling edge 22 in this instance is equal to 12 inches and the circumferential length of a quadrant of said edge equals 3", and one half of the length of the quadrant equals 1½ inches. The diameter of the rolling edge 22 equals 3.8198 inches and its radius equals 1.9099 inches. To measure the distance A b with the edge 22 it must travel approximately 1.9 inches or 4/10 of an inch more than the circumferential length of one-half of a quadrant.

In Fig. 8 an example of measuring with the rotometer between corners of a wall is indicated. A main wall A B is shown with the side walls A D and B F and with the corners A and B. The arrow 26 or zero point of the rim 21 of the casing A is brought opposite the pointer 80 and the indicating line 94 which in this instance is distant from the pointer 80 on the edge 22 of the rim 21 a distance equal to 4/10 of an inch is made to coincide with the diagonal line A C extending from the center of the rotometer to the corner A. The rotometer is then rolled with the edge 22 on the wall A B from A to B until it bears against the wall B F, and the indicating line 95 is made to coincide with diagonal line B C, by rotating the dial plate 37 by means of the handle 79.

The distance between the walls is then read by means of the pointer 80 and the scale 23 and the numerals on the dials indicated through the openings 82, 83 and 84. (Fig. 1.) In case the distance from the corner A is to be measured to a point on the wall A B before the wall B F is reached the location of the pointer 80 is brought in contact with the point on the wall A B, the distance of which from the corner A will thereby be shown on the scale of the rotometer.

It will be noted that the length of the arc h b extending from the point b which is the point of tangency of the rolling edge 22 with the wall A B and the point h which is the intersection of a radial line from the center C of the rotometer through the pointer 80 and the edge 22 is equal to the distance A b. The lines 94 and 95 serve to locate the pointer 80, to be enabled to measure the distance from the point of tangency of the rotometer from the corners of the wall. Various modifications may be made in the invention without departing from the spirit thereof, and the present exemplification is to be taken as illustrative of the invention and not limitative thereof.

Having described my invention what I desire to secure by Letters Patent and claim is:—

1. In a measuring apparatus the combination of a casing having a curved circumferential rolling edge with a scale, a pivot in the axial center of the casing and fastened thereto, a journal bearing journaled on the pivot, a dial plate with a pointer extending from the journal bearing, counters meshing with each other rotatively carried on the dial plate and a pin extending from the casing coacting with one of said counters.

2. In a measuring apparatus the combination of a casing having a circumferential rolling edge formed therewith, a pivot extending from the casing, a dial plate with a pointer journaled on the pivot, a cup-shaped counter with teeth on its lower edge and a supplemental tooth at its upper portion journaled on the dial plate, a pin in the casing coacting with the teeth of the counter at its lower portion, a disc counter with indentations and a supplemental tooth journaled on the dial plate, the indentations coacting with the supplemental tooth of the first counter, a third counter also cup-shaped and having an annular flange with indentations at its lower portion journaled on the dial plate, the indentations of the latter counter coacting with the supplemental tooth of the second counter and means to maintain the dial plate at rest while the casing is rolling.

3. In a measuring apparatus the combination of a casing adapted to roll, a dial plate, means to prevent the dial plate rotating during the rotation of the casing, counters to indicate the distance traveled by the casing, the said dial plate having corner indicating lines thereon to adapt the measuring device to measure from a corner at one end of an object to be measured to a second corner of the object.

4. In a measuring apparatus the combination of a casing with a scale thereon and its outer circumferential portion turned over to form a curved rolling edge, a dial plate having openings journaled within the casing and having a pointer indicated thereon, a plurality of counters journaled on the dial plate co-acting with each other, the said counters having numerals visible through the openings in the dial plate, a pin in the casing co-acting with one of the counters and means to prevent the dial plate rotating while the casing is rolling.

5. In a measuring apparatus the combination of a casing with a rolling edge and a scale, a dial plate journaled in the casing, having a pointer, counters adapted to turn in opposite directions journaled on the dial plate and coacting with each other and a pin extending from the casing coacting with one of the counters, said dial plate having means to locate it in the proper position with respect to the scale of the casing to enable the apparatus to measure a distance from a corner.

6. In a measuring apparatus the combination of a casing having a scale, a dial plate journaled within the casing and having a pointer indicated thereon coacting with the scale of the casing, a plurality of counters journaled on the dial plate coacting with each other, and adapted to function in one direction and in a direction opposite thereto to enable the apparatus to measure in reverse directions, a pin in the casing coacting with one of the counters and means to prevent the dial plate rotating while the casing is rolling.

7. In a measuring apparatus the combination of a dial plate, a casing rotatably connected to the dial plate, and a rim with a scale for the casing, said rim having a pointer and an indicating line, said line enabling the apparatus to measure from a corner by directing said line to take the direction of a line bisecting the corner.

8. In a measuring apparatus the combination of a dial plate, a casing rotatably connected to the dial plate, said dial plate having a pointer and a pair of indicating lines, said lines enabling the apparatus to measure from one corner to a second corner by directing one of said lines to take the direction of a line bisecting the first corner and the second line taking the direction of a line bisecting the second corner after the apparatus has been rolled from the first corner to the second corner.

9. In a measuring apparatus the combination of a casing having a flange with a curved rolling edge, said flange having a scale indicated thereon, a pivot extending from the casing, a dial plate with a pointer journaled on the pivot, counters having teeth adapted to mesh with each other journaled on the dial plate, a pin extending from the casing coacting with the teeth of one of said counters, and a spring for each counter with one end of each connected to the dial plate and the other ends of the springs contacting with said counters.

10. In a measuring apparatus the combination of a casing having a flange with a curved rolling edge, said flange having a scale indicated thereon, a pivot extending from the casing, ratchet teeth formed with the casing, a dial plate with a pointer journaled on the pivot, counters having teeth adapted to each other journaled on the dial plate, a pin extending from the casing coacting with the teeth of one of said counters, a pawl with a pair of arms with one arm thereof enabled to coact with said ratchet teeth and a spring latch to detachably lock with the other arm of the pawl.

11. In a measuring apparatus the combination of a casing having a flange with a curved rolling edge, said flange having a scale indicated thereon, a pivot extending from the casing, ratchet teeth formed with the casing, a dial plate with a pointer journaled on the pivot, counters having teeth adapted to mesh with each other journaled on the dial plate, a pin extending from the casing coacting with the teeth of one of said counters, a pawl with a pair of arms with one arm thereof normally engaging said ratchet teeth, a spring bearing against said pawl to normally maintain it in contact with the ratchet teeth and a spring latch in the path of said pawl to lock therewith and maintain it disengaged from said ratchet teeth.

Signed at the borough of Manhattan, city of New York, in the county of New York and State of New York this 6th day of August A. D. 1920.

OTIS J. DORWIN.